O. C. RITZ-WOLLER.
WINDSHIELD CLEANER.
APPLICATION FILED MAR. 26, 1921.

1,402,657.

Patented Jan. 3, 1922.

Inventor:
Oliver C. Ritz-Woller.
By Daniel Brennan.
Atty

UNITED STATES PATENT OFFICE.

OLIVER C. RITZ-WOLLER, OF CHICAGO, ILLINOIS.

WINDSHIELD CLEANER.

1,402,657.  Specification of Letters Patent.  Patented Jan. 3, 1922.

Application filed March 26, 1921. Serial No. 455,739.

*To all whom it may concern:*

Be it known that I, OLIVER C. RITZ-WOLLER, a citizen of the United States, residing at Chicago, county of Cook, and State of Illinois, have invented a new and useful Improvement in Windshield Cleaners, of which the following is a specification.

This invention relates to improvements in wind shield cleaners.

It is an object to provide a device of this kind which can be readily attached to a wind shield by placing it over the edge of the shield, and which may then be moved transversely or in some other way so as to remove moisture, or the like, from the face of the shield.

It is an object of the invention to combine with a supporting member for the cleaner, rubber elements or squeegees, and to permit of adjustment of these squeegees with respect to the supporting member. Owing to this adjustment, different portions of the shield may then be cleaned by movement of the device over the shield.

Another object of the invention is to provide a device which can be manufactured at low expense and which can be readily attached to, or removed from, a shield.

With these and numerous other objects in view, which will be apparent from the following description, the invention is set forth in the accompanying specification and is illustrated by way of example in a single embodiment in the accompanying drawing.

In the drawing:—

Figure 1:
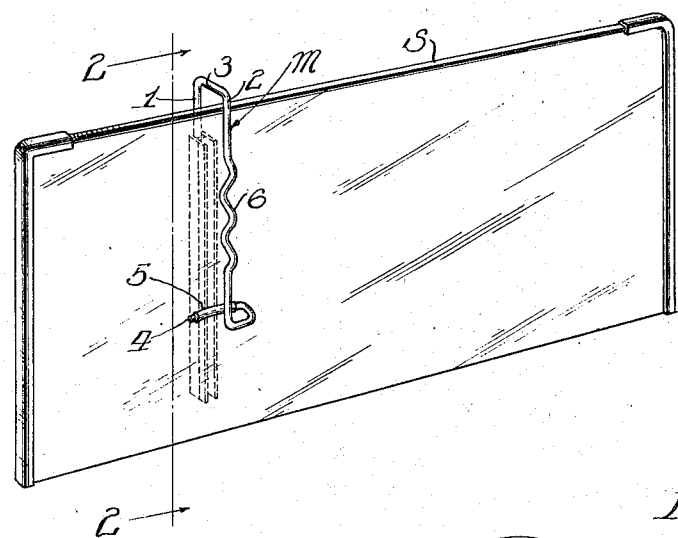
Fig. 1 is a perspective view of a wind shield with the cleaner attached thereto.
Figure 2:
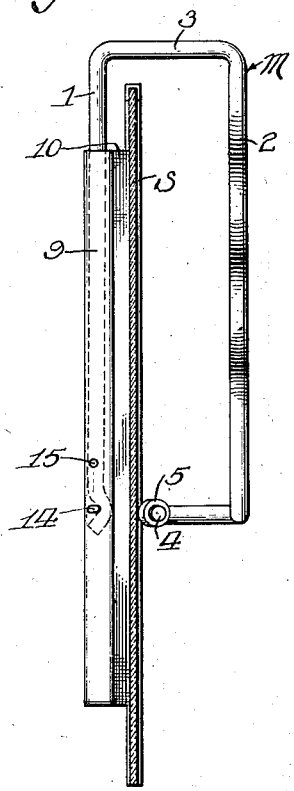
Fig. 2 is a vertical section on line 2—2 of Fig. 1 on a different scale.
Figure 3:
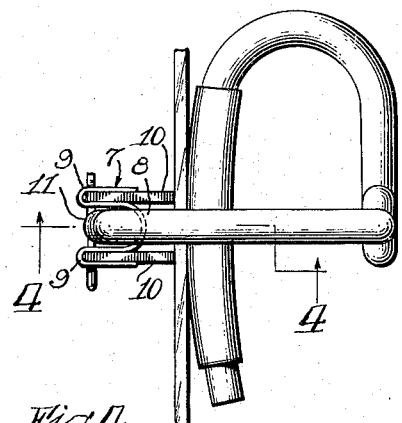
Fig. 3 is a top plan view of the wind shield combined with the cleaner.

The cleaner comprises a supporting member M preferably formed of a piece of stout wire or metal rod bent into approximately bail shaped form. The two legs 1 and 2 of this bail shaped member are substantially parallel to each other and are united at one end by a transverse portion 3, the resiliency of the metal having a tendency to press the legs toward each other. The lower end of the leg 2 of the supporting member is bent in direction towards the wind shield S', and terminates in a short extension 4, which is in a plane at substantially right angles to the leg 2. This extension is in engagement with the wind shield and is preferably inclosed in a short piece of flexible tubing 5, of rubber or the like, for increasing the friction on the glass of the shield without, however enhancing the danger of breakage of the glass. For the purpose of reinforcing this leg 2 of the support it may be provided with a plurality of undulated portions 6, or crimps as shown in Figs. 1 and 2.

The other leg is substantially straight and is located on the opposite side of the shield. This leg 1 is disposed between parallel longitudinal portions of a carrier 7 or holder, preferably made of sheet metal and comprising a trough-shaped central portion 8 having its bottom directed towards the wind shield while two parallel longitudinal clamping portions 9 are disposed one at each side of the central portion 8, said portions 9 being open in direction towards the shield. The lateral trough-shaped portions 9 are considerably narrower than the central portions 8, and they serve for frictionally supporting the squeegees 10, in the form of flexible strips of rubber, or the like.

Figure 4:
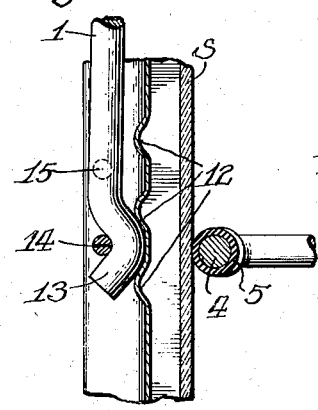
Fig. 4 is a section on line 4—4 of Fig. 3.
Figure 5:
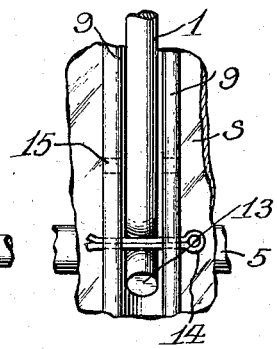
Fig. 5 is a rear elevation of a portion of the cleaner and shield.

From Fig. 4 it will be noted that the bottom 8 of the central trough 11 is provided in the lower portion with a plurality of notches or corrugations 12. The leg 1 of the cleaner support terminates in a hook 13 of a size to fit between two notches 12, whereby these notches may serve as a means for preventing relative movement of the holder 7 with respect to the supporting member of the cleaner and vice versa. The supporting member is locked in position to prevent accidental displacement, by a cotter pin 14, or the like, which passes through the lateral trough-shaped portion 9 and which also passes transversely through the bight of the hook 13. Several openings 15 may be provided in the lateral trough-shaped portions 9 to permit of adjustment and of locking the supporting member 1 in a predetermined position with respect to the holder of the squeegees.

The operation of the device will be understood from the above. The supporting member M is placed over the edge of the wind shield S and slid inwardly until the transverse portion 3 contacts the edge of the shield, or to a less depth, if desired. The member is then held in operative position, owing to the frictional pressure exerted by the metal of the member through the arm 4 against the glass of the shield on one side, and owing to the pressure with which the flexible parts 10 engage the glass from the other side. This frictional engagement from both sides of the shield will be maintained even if the cleaner is moved transversely of the shield or swung in the plane of the shield, and that surface of the shield with which the squeegees are in engagement will thereby be cleaned.

I claim:

1. In a wind shield cleaner, the combination of an integral support having resilient gripping legs adapted to lie one on each side of a wind shield, one of said legs receiving a squeegee holder, said holder comprising a metal plate formed with integral parallel channels, and squeegees in said channels.

2. In a wind shield cleaner the combination of a bail-shaped integral supporting member having its legs on opposite sides of a wind shield, one of said members terminating in an integral hook, and a squeegee holder having stops in engagement with said hook.

3. In a wind shield cleaner the combination of a bail-shaped supporting member having its legs on opposite sides of a wind shield, a squeegee holder having a central longitudinal trough-shaped portion and lateral squeegee channel portions, one leg of the supporting member being adjustably secured to the central longitudinal portion of the holder.

4. In a wind shield cleaner the combination of a bail-shaped supporting member the legs of which are forced towards each other by the resiliency of the material, one leg of the member terminating in a hook, and the other leg terminating in an extension pressed against the shield in opposition to the hook, a squeegee holder having notches between which the hook is inserted, and a locking device for preventing longitudinal movement of the holder with respect to the supporting member.

5. In a wind shield cleaner, the combination of an integral support having resilient gripping legs adapted to lie one on each side of a wind shield, a squeegee holder comprising a plate formed with a central longitudinal trough portion bordered by parallel spaced channels receiving each a squeegee, and means for securing one of said legs in said trough.

6. In a wind shield cleaner, the combination of a support comprising integrally connected contractile legs adapted to lie one on each side of a wind shield, one of said legs having its end offset, a squeegee holder, means for pivotally and longitudinally adjustably connecting said offset leg with said squeegee holder, comprising a pin engaging said offset leg and a series of depressions in the holder, one of which is adapted to receive said offset portion.

7. In a wind shield cleaner, the combination of a supporting member having integral legs which are pressed toward each other, said legs being disposed at opposite sides of a wind shield, and a detachable squeegee holder pivotally and longitudinally adjustably connected with the end of one of said legs, and means for locking the squeegee holder in adjusted position on said leg.

In testimony whereof, I affix my signature in the presence of two witnesses at 36 W. Randolph St., Chicago, Illinois:

OLIVER C. RITZ-WOLLER.

Witnesses:
S. A. I. WATKINS,
J. E. WHITE.